United States Patent [19]

Kasai et al.

[11] Patent Number: 5,262,477
[45] Date of Patent: Nov. 16, 1993

[54] POLYPHENYLENE ETHER COPOLYMER AND THERMOPLASTIC RESIN COMPOSITIONS CONTAINING THE SAME

[75] Inventors: Kouji Kasai, Yokohama; Osamu Ishihara, Sodegaura, both of Japan

[73] Assignee: Asahi Kasei Kogyo Kabushiki Kaisha, Osaka, Japan

[21] Appl. No.: 857,840

[22] Filed: Mar. 26, 1992

[51] Int. Cl.$^5$ ............................................... C08L 71/12
[52] U.S. Cl. ...................................... 525/68; 525/397; 525/905
[58] Field of Search ........................... 525/68, 905, 397

[56] References Cited

U.S. PATENT DOCUMENTS

| | | | |
|---|---|---|---|
| 3,661,852 | 5/1972 | Flowers et al. | 260/65 |
| 4,065,608 | 12/1977 | Beck et al. | 526/49 |
| 4,350,797 | 9/1982 | Marzola et al. | 525/293 |
| 4,816,515 | 3/1989 | Weiss | 525/68 |
| 4,914,153 | 4/1990 | Togo et al. | 525/68 |
| 4,957,966 | 9/1990 | Nishio et al. | 525/66 |
| 5,086,112 | 2/1992 | Togo et al. | 525/396 |

FOREIGN PATENT DOCUMENTS

| | | |
|---|---|---|
| 0268486 | 5/1988 | European Pat. Off. |
| 0395993 | 11/1990 | European Pat. Off. |
| 0408255 | 1/1991 | European Pat. Off. |
| 451539A1 | 10/1991 | European Pat. Off. |
| 2210284 | 9/1973 | Fed. Rep. of Germany |
| WO87/00540 | 1/1987 | PCT Int'l Appl. |

OTHER PUBLICATIONS

Makormolekulares Kollegium, Feb. 25-27, 1993, pp. 69-70, Lambla et al., "Free Radical Grafting of Activated Monomers onto Polypropylene".

Derwent Abstract 90-095 397/13 of J02047154.
Derwent Abstract 85-267 522/43 of J60181160.
Derwent Abstract 190 02C/11 of J55013706.

*Primary Examiner*—James J. Seidleck
*Assistant Examiner*—Thomas Hamilton, III
*Attorney, Agent, or Firm*—Armstrong, Westerman, Hattori, McLeland & Naughton

[57] ABSTRACT

The present invention relates to a polyphenylene ether copolymer and thermoplastic resin compositions thereof which are excellent in heat resistance, thermal stability, mechanical strength, moldability and solvent resistance.

Particularly, the present invention relates to a polyphenylene ether-polyolefin copolymer formed by covalent bonding between a polyphenylene ether and a polyolefin, each of which has a specific melt viscosity. The copolymer is represented by the formula (1):

$$P-Z_1-R_1-Z_2-Q \qquad (1)$$

wherein P is a polyphenylene ether component, Q is a polyolefin component, and each of $Z_1$ and $Z_2$ is a connecting group such as imide group, amide group or the like and $R_1$ is an alkylene group, an arylene group or a cycloalkylene group and a resin composition comprising said copolymer, a polyphenylene ether and a polyolefin.

Said copolymer and said resin compositions have the excellent properties described above, and hence are useful for the production of outside panels and external trims of automobiles, electrical and electronic machinery and apparatus.

16 Claims, 1 Drawing Sheet

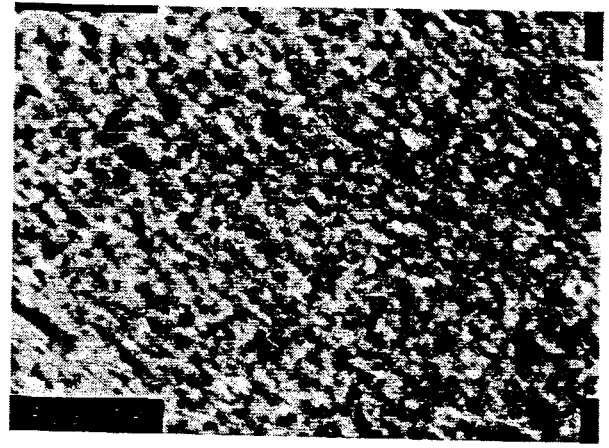
(EXAMPLE 1) 5μm
×2,000
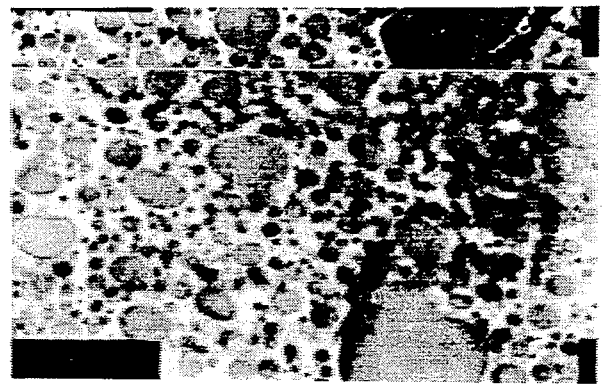
(EXAMPLE 2) 5μm
×2,000
(COMPARATIVE EXAMPLE 1) 20μm
×500

POLYPHENYLENE ETHER COPOLYMER AND THERMOPLASTIC RESIN COMPOSITIONS CONTAINING THE SAME

BACKGROUND OF THE INVENTION

1. Field of the Invention

The present invention relates to a polyphenylene ether copolymer and thermoplastic resin compositions containing said copolymer. The copolymer and compositions are excellent in heat resistance, thermal stability, mechanical strength, moldability and solvent resistance.

2. Prior Art

Polyphenylene ether resins are excellent in heat resistance, mechanical strength, electrical characteristics, dimensional stability and water resistance, but are disadvantageous in that they are poor in solvent resistance and molding processability.

As a means for improving the solvent resistance and molding processability of a polyphenylene ether, various attempts have been made to blend a polyolefin with the polyphenylene ether.

However, in the case of mixing a polyphenylene ether resin and a polyolefin resin proposed by Jap. Pat. Pub. No. SHO 42 (1967)-7069, since the compatibility between the polyphenylene ether and the polyolefin is poor, addition of a large amount of the polyolefin causes exfoliation in a molded product obtained from the resins. In the case of a resin composition comprising a polyphenylene ether, a polyolefin and a partially hydrogenated alkenyl aromatic compound-conjugated diene block copolymer, which has been proposed by Jap. Pat. Appln. Kokai (Laid-Open) No. SHO 63 (1988)-83149, and a resin molded product obtained using a polyphenylene ether as a continuous phase and dispersing at least one copolymer having a specified particle size and selected from the group consisting of vinyl aromatic compound-conjugated diene compound copolymers and hydrogenated products thereof in a polyolefin outer layer, which has been proposed by Jap. Pat. Appln. No. SHO 63 (1988)-276314 (WO 9105016), they are disadvantageous in that they do not have heat resistance sufficient to contain the alkenyl aromatic compound and they form a flow mark under severe molding conditions.

A composition comprising a polyolefin having a glycidyl group and a polyphenylene ether proposed by Jap. Pat. Appln. Kokai (Laid-Open) No. SHO 61 (1986)-53355 does not have sufficiently improved mechanical strength and heat resistance. Jap. Pat. Appln. Kokai (Laid-Open) No. SHO 63 (1985)-1289056 (U.S. Pat. No. 4914153 and EP 268486) discloses a resin composition comprising a polyphenylene ether modified with an acid anhydride, a polyolefin modified with glycidyl methacrylate or the like and a vinyl or vinylidene compound, and a binder such as diamine. However, although this composition has somewhat improved mechanical strength and solvent resistance, it is insufficient in heat resistance because the modified polyolefin contains, for example, styrene as an essential constituent.

Jap. Pat Appln. Kokai (Laid-Open) No. HEI 2 (1990)-173137 has proposed a resin composition comprising a polyphenylene ether, a modified polyolfin containing an amino group, a polar-group-containing polyphenylene ether, and a polyolfin. However, a molded product obtained from this composition is not sufficient in mechanical strength.

Jap. Offic. Pat. Gaz. No. HEI 2 (1990)-500283 (WO 8808433) discloses a composition comprising a reaction product of a polyphenylene ether with a substituted olefin having a functional group, and a polyolefin reactive therewith. However, this composition does not have sufficient mechanical strength.

SUMMARY OF THE INVENTION

The present invention is directed to improving the moldability and solvent resistance of a polyphenylene ether, and to novel thermoplastic resin materials excellent in heat resistance, thermal stability and mechanical strength.

In order to develop a thermoplastic resin obtained from a polyphenylene ether and a polyolefin as basic components and which is excellent in heat resistance, thermal stability, solvent resistance, molding processability and mechanical strength, the present inventors earnestly investigated and consequently found that a thermoplastic resin excellent in various properties including heat resistance, thermal stability, etc. can be obtained by forming a polymer in which a polyphenylene ether and a polyolefin, each of which has a specified melt viscosity, are covalently bound to each other through a specified structure, whereby the present invention has been accomplished.

The first aspect of the present invention is directed to a polyphenylene ether-polyolefin copolymer obtained by reacting a modified polyphenylene ether having an MI (280° C., 10 kg load) of 0.01 to 10 g/10 min with a modified polyolefin having an MI (230° C., 2.16 kg load) of 1.0 to 50 g/10 min in the presence or absence of a binder, the copolymer comprising a polyphenylene ether block and a polyolefin block which are covalently bonded to each other in a manner represented by the formula (1):

wherein P is a polyphenylene ether component; Q is a polyolefin component; and each of $Z_1$ and $Z_2$ is a connecting group, namely, $Z_1$ is an imide group, an amide group or a connecting group represented by the formula (2):

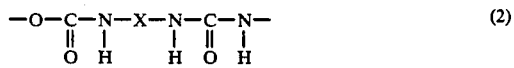

or the formula (3):

(wherein X is an alkylene group, an arylene group, a cycloalkylene group, or a cyclized product of a dimer or trimer of an isocyanate), and $Z_2$ is an imide group, an amide group or a connecting group represented by formula (4):

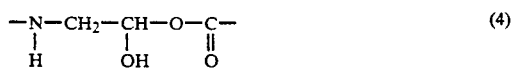

and $R_1$ is an alkylene group, an arylene group, or a cycloalkylene group.

The second aspect of the present invention is directed to a thermoplastic resin composition comprising (A) the aforesaid polyphenylene ether-polyolefin copolymer, (B) a polyphenylene ether and/or a modified polyphenylene ether having a functional group selected from the group consisting of carboxylic acid groups and ester derivative groups thereof, acid anhydride groups, epoxy groups, amino groups, and isocyanate groups, (C) a polyolefin and/or a modified polyolefin having a functional group selected from the group consisting of carboxylic acid groups and ester derivative groups thereof, acid anhydride groups, epoxy groups, and amino groups, and, (D) at least one elastomer,
the amounts of components (A), (B) and (C) being in the following ranges:
(A): 1 to 99 parts by weight,
(B): 0 to 95 parts by weight, and
(C): 0 to 95 parts by weight, and the amount of component (D) being 0 to 30 parts by weight per 100 parts by weight of the sum of components (A), (B) and (C).

The third aspect of the present invention is directed to a thermoplastic resin composition comprising components (A), (B), (C) and (D), the amounts of components (A), (B) and (C) being in the following ranges:
(A): 1 to 99 parts by weight,
(B): 0 to 95 parts by weight, and
(C): 0 to 95 parts by weight, the total amount of components (A), (B) and (C) being 100 parts by weight, and the amount of component (D) being 1 to 30 parts by weight per 100 parts by weight of the total amount of components (A), (B) and (C).

The fourth aspect of the present invention is directed to a thermoplastic resin composition comprising components (A), (B) and (C), the amounts of components (A), (B) and (C) per 100 parts of the sum of these three components being in the following ranges:
(A): 1 to 99 parts by weight,
(B): 0 to 95 parts by weight, and
(C): 0 to 95 parts by weight.

The fifth aspect of the present invention is directed to a thermoplastic resin composition comprising components (A) and (D), the amount of component (D) per parts by weight of component (A) being 1 to 30 parts by weight.

BRIEF DESCRIPTION OF DRAWINGS

FIG. 1 is a photomicrograph at a magnification of 2,000 of a slice of the molded product sample obtained in Example 1.

FIG. 2 is a photomicrograph at a magnification of 2,000 of a slice of the molded product sample obtained in Example 2.

FIG. 3 is a photomicrograph at a magnification of 500 of a slice of the molded product sample obtained in Comparative Example 1.

DETAILED DESCRIPTION OF PREFERRED EMBODIMENTS

The polyphenylene ether used in the present invention can be a homopolymer comprising repeating units represented by the formula (5):

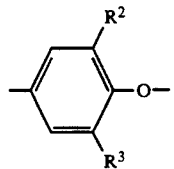
(5)

wherein at least one of $R^2$ and $R^3$, which can be the same or different, is a straight-chain alkyl, hydroxyalkyl or haloalkyl group having 1 to 4 carbon atoms, a primary or secondary branched-chain alkyl, hydroxyalkyl or haloalkyl group having 1 to 4 carbon atoms, an aryl group, or a halogen atom, and the other is a hydrogen atom; or a copolymer comprising repeating units represented by the above formula (5) and repeating units represented by the formula (6):

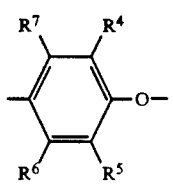
(6)

wherein $R^4$, $R^5$, $R^6$ and $R^7$, which can be the same or different, are straight-chain alkyl, hydroxyalkyl or haloalkyl groups having 1 to 4 carbon atoms, primary or secondary branched-chain alkyl, hydroxyalkyl or haloalkyl groups having 1 to 4 carbon atoms, aryl groups, halogen atoms, or hydrogen atoms, with the proviso that $R^4$ and $R^5$ are not hydrogen atoms at the same time).

Typical examples of the polyphenylene ether homopolymer are homopolymers such as poly(2,6-dimethyl-1,4-phenylene) ether, poly(2-methyl-6-ethyl-1,4-phenylene) ether, poly(2,6-diethyl-1,4-phenylene) ether, poly(2-ethyl-6-n-propyl-1,4-phenylene)ether, poly(2,6-di-n-propyl-1,4-phenylene) ether, poly(2-methyl-6-n-butyl-1,4-phenylene) ether, poly(2-methyl-6-butyl-1,4-phenylene) ether, poly(2-ethyl-6-isopropyl-1,4-phenylene) ether, poly(2-methyl-6-chloro-1,4-phenylene) ether, poly(2-methyl-6-hydroxyethyl-1,4-phenylene) ether, poly(2-methyl-6-chloroethyl-1,4-phenylene) ether, and the like.

The polyphenylene ether copolymers include those obtained by copolymerizing 2,6-dimethylphenol with o-cresol or an alkyl-substituted phenol, such as 2,3,6-trimethylphenol, which is represented by the formula (7):

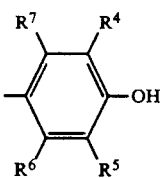
(7)

wherein $R^4$, $R^5$, $R^6$ and $R^7$ have the same meanings as those defined above.

Of the above-exemplified polymers, poly(2,6-dimethyl-1,4-phenylene) ether is preferred.

As the polyphenylene ether used as a starting material for producing the modified polyphenylene ether polymer of the present invention, there is advantageously used a polyphenylene ether having a degree of polymerization of 0.30 to 1.5, preferably 0.4 to 1.0, in terms of intrinsic viscosity [η] (chloroform solution, 30° C.) when the polyphenylene ether is either a homopolymer or a copolymer.

The polyolefin used in the present invention includes homopolymers obtained from an α-olefin having 2 to 20 carbon atoms, such as ethylene, propylene, butene-1, pentene-1, 4-methylpentene-1, isobutylene or the like; copolymers obtained from two or more of these α-olefins; copolymers of these α-olefins and dienes such as 1,4-hexadiene, dicyclopentadiene, 2,5-norbonadiene, 5-ethyl-2,5-norbonadiene, 5-ethylidenenorbornene, butadiene, etc.; and copolymers of the α-olefins and olefin derivatives such as vinyl acetate, acrylic acid esters, and the like.

Of these polyolefins, polyethylenes and polypropylenes are preferable, and the polypropylenes are particularly preferable.

The connecting group $Z_1$ in the formula (1) is an imide group, an amide group, or a connecting group represented by the formula (2):

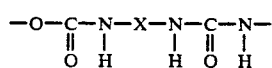
(2)

or the formula (3):

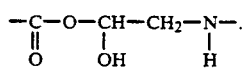
(3)

The imide group can be formed by the reaction of an amine with an acid anhydride. The amide group can be formed by the reaction of an amine with a carboxylic acid. The connecting group represented by the formula (2):

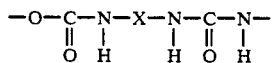
(2)

can be formed by the reaction of a polyisocyanate compound with a —OH group and an amine. The connecting group represented by the formula (3):

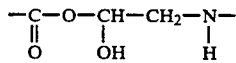
(3)

can be formed by the reaction of an epoxy with an amine.

The aforesaid imide group includes imide groups having the structure shown below as formulas (8), but is not limited thereto.

Formulas (8):

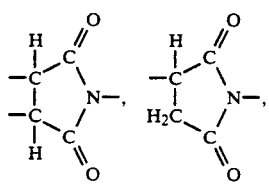
(8)

-continued

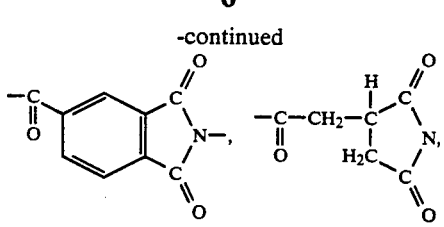

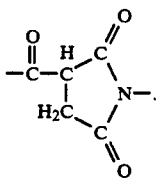

As the aforesaid amide group, there can be exemplified amide groups having any of the following structures represented by the formulas (9) and the formulas (10):

Amide groups of the formulas (9):

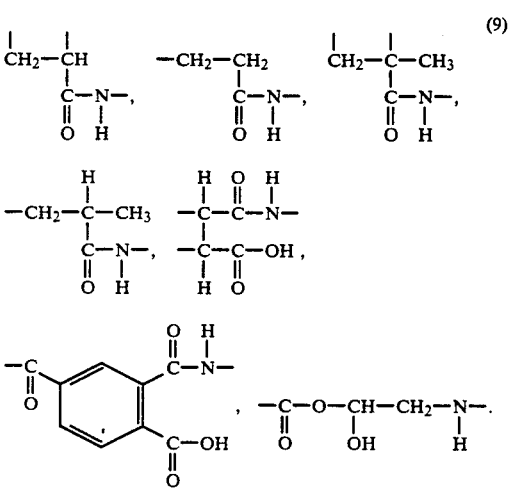
(9)

Amide groups of the following formula (10):

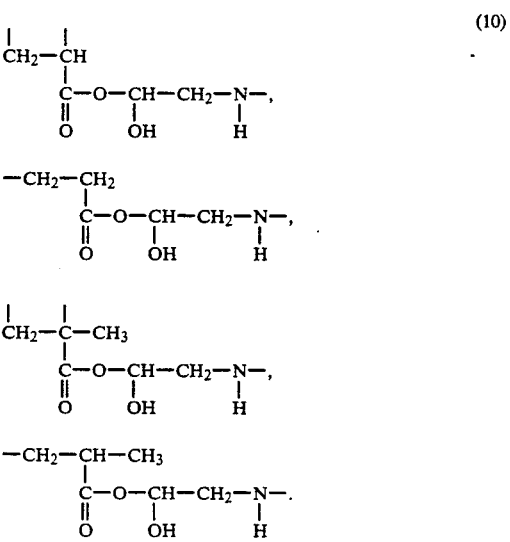
(10)

Needless to say, the aforesaid amide group is not limited to the amide groups exemplified above.

X in the connecting group represented by formula (2):

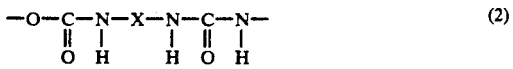

is an alkylene group, an arylene group, a cycloalkylene group, or a cyclized product group formed out of a dimer or trimer of an isocyanate. Specific examples of X are groups having a structure represented by the following formulas (11):

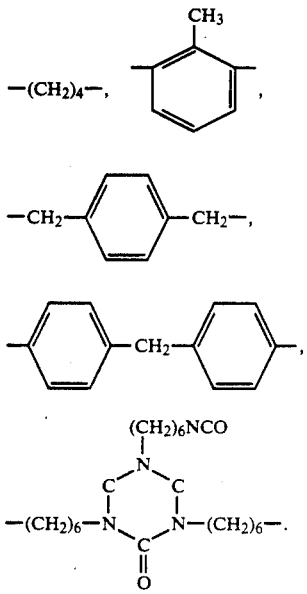

X is not limited thereto.

As the connecting group $Z_2$, there is used an imide group, an amide group or a connecting group represented by the formula (4):

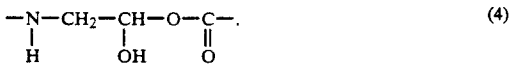

Specific examples of the imide group and the amide group are the same as those described above for $Z_1$.

Specific examples of $R_1$ are alkylene groups having 1 to 12 carbon atoms, such as an ethylene group, propylene group, hexamethylene group, dodecylene group, etc.; arylene groups such as a phenylene group, diphenylene group, cyclohexylene group, etc.; and cycloalkylene groups. $R_1$ is not limited thereto.

As described above, the present invention is directed to a copolymer comprising a polyphenylene ether block and a polyolefin block. The present inventors found that a composition comprising this copolymer, a polyphenylene ether, a polyolefin and the like is excellent in heat resistance and mechanical properties, and that a molded product obtained from the composition under severe molding conditions does not show peeling, a flow mark, or the like. Furthermore, the present inventors found that for further improving the above characteristics, there can be selected suitable ranges of melt viscosity of a modified polyphenylene ether and a modified polyolefin which are starting materials for obtaining the copolymer.

The modified polyphenylene ether and the modified polyolefin are first explained below.

The modified polyphenylene ether used in the present invention is one which has an MI (280° C., 10 kg load) of 0.01 to 10 g/10 min, preferably 0.1 to 8 g/10 min.

When the MI of the modified polyphenylene ether is less than 0.01 g/10 min, bonding between the polyphenylene ether and polyolefin does not proceed sufficiently, so that the resulting copolymer is not desirable. That is, in the case of a composition comprising such a copolymer, a polyphenylene ether and a polyolefin, exfoliation or the formation of a flow mark tends to occur. For example, as shown in Comparative Example 6, when a copolymer obtained by the use of a modified polyphenylene ether having an MI of less than 0.01 g/10 min is used, peeling occurs. When the MI of the modified polyphenylene ether exceeds 10 g/10 min, the mechanical strength is deteriorated, or a remarkable weld line is formed.

Specific means for producing the modified polyphenylene ether include the following methods but are not limited thereto.

As a first method, there can be mentioned a method which comprises reacting a polyphenylene ether with a compound selected from the group consisting of acid anhydrides such as maleic anhydride, trimellitic anhydride chloride, chloroethanoylsuccinic anhydride, chloroformylsuccinic anhydride, etc.; unsaturated carboxylic acids such as fumaric acid, acrylic acid, butenoic acid, vinylacetic acid, methacrylic acid, etc.; esters of these unsaturated carboxylic acids; epoxy compounds such as glycidyl acrylate, glycidyl methacrylate, etc.; diisocyanate compounds such as hexamethylene diisocyanate, cyclohexylene diisocyanate, dicyclohexylmethane diisocyanate, isophorone diisocyanate, phenylene diisocyanate, toluene diisocyanate, xylene diisocyanate, naphthalene diisocyanate, diphenylmethane diisocyanate, dimethyldiphenylmethane diisocyanate, dimethyldiphenylene diisocyanate, etc.; triisocyanate compounds such as triphenylmethane triisocyanate, benzene triisocyanate, etc.; oligomers such as dimers and trimers of the above isocyanate compounds; substituted derivatives of the above isocyanate compounds which have as the substituent an alkyl group, an allyl group, an aryl group, a heteroatom-containing substituent, etc.; isomers of the above isocyanate compounds; and reaction products (retaining an isocyanate group) of the above isocyanate compounds with a compound of a molecular weight of 3,000 or less having an alcohol residue or a carboxylic acid residue (hereinafter, this method is referred to as "modification method A-1").

As a second method, there can be mentioned a method which comprises reacting a polyphenylene ether with a reaction product (retaining an amino group) of a compound selected from the group consisting of the above acid anhydrides, unsaturated carboxylic acids, esters of the unsaturated carboxylic acids, epoxy compounds and isocyanate compounds, with an aliphatic, aromatic or alicyclic diamine such as ethylenediamine, hexamethylenediamine, xylylenediamine, 1,2-cyclohexanediamine, 1,3-cyclohexanediamine or the like (hereinafter, this method is referred to as "modification method A-2").

As a third method, there can be mentioned a method which comprises reacting a polyphenylene ether with a compound selected from the group consisting of the above acid anhydrides, unsaturated carboxylic acids, esters of the unsaturated carboxylic acids, epoxy compounds, isocyanate compounds and the like, and then reacting the reaction product with the above aliphatic, aromatic or alicyclic diamine (hereinafter, this method is referred to as "modification method A-3").

The amount of the above compounds attached to the polyphenylene ether is preferably $1.5 \times 10^{-5}$ mole/g to $20.0 \times 10^{-5}$ mole/g, more preferably $1.5 \times 10^{-5}$ mole/g to $18.0 \times 10^{-5}$ mole/g.

The modified polyolefin used in the present invention is one which has an MI (230° C., 2.16 kg load) of 1.0 to 50 g/10 min, preferably 3.0 to 40 g/10 min. The use of such a modified polyolefin permits improvement of the mechanical strength and prevention of exfoliation which are unachievable by the use of a block copolymer of the modified polyphenylene ether and a modified polyolefin having a low viscosity outside the range specified in the present invention. That is, when the MI of the modified polyolefin exceeds 50 g/10 min, bonding between polyphenylene ether and polyolefin does not proceeds sufficiently. Therefore, when a composition comprising the resulting copolymer, a polyphenylene ether and a polyolefin is made into a molded product, exfoliation or the formation of a flow mark tends to occur. When the MI is less than 1.0 g/10 min, the mechanical strength is deteriorated, or a remarkable weld line is formed. For example, as shown in Comparative Examples 5 and 7, in the case of modified polyolefins having an MI of 60 g/10 min and 200 g/10 min, respectively, peeling takes place in a molded product.

Specific means for modifying a polyolefin include the following methods but are not limited thereto.

As a first modification method, there can be mentioned a method which comprises reacting a polyolefin with a compound selected from the group consisting of unsaturated carboxylic acids such as fumaric acid, acrylic acid, butenoic acid, vinylacetic acid, methacrylic acid, etc.; esters of these unsaturated carboxylic acids; acid anhydrides such as maleic anhydride; and epoxy compounds such as glycidyl acrylate, glycidyl methacrylate, etc. (hereinafter, this method is referred to as "modification method B-1").

As a second method, there can be mentioned a method which comprises reacting a polyolefin with a reaction product (retaining an amino group) of a compound selected from the group consisting of the above acid anhydrides, unsaturated carboxylic acids, esters of the unsaturated carboxylic acids, and epoxy compounds, with an aliphatic, aromatic or alicyclic diamine such as ethylenediamine, hexamethylenediamine, xylylenediamine, 1,2-cyclohexanediamine, 1,3-cyclohexanediamine, or the like (hereinafter, this method is referred to as "modification method B-2").

As a third method, there can be mentioned a method which comprises reacting a polyolefin with a compound selected from the group consisting of the above acid anhydrides, unsaturated carboxylic acids, esters of the unsaturated carboxylic acids, and epoxy compounds, and then reacting the reaction product with the above aliphatic, aromatic or alicyclic diamine (hereinafter, this method is referred to as "modification method B-3").

For carrying out the above reactions, there is employed a method of kneading the reactants in a molten state, or a method of mixing the reactants in solution by stirring. When the reaction is carried out by the melt kneading method, the kneading temperature is not critical, though in general, it is preferably 150° to 350° C. Specific examples of a suitable kneader are an extruder, Banbury mixer and roll mill. As the solution method, there can be exemplified a method in which the stirring is conducted with refluxing in hot xylene.

In both the melt kneading method and the solution method, reaction assistants such as peroxides may be added if necessary. Of these methods, the melt kneading method is preferable.

The MI (230° C., 2.16 kg load) of the starting polyolefin used in the above modification is preferably 0.5 to 40 g/10 min, more preferably 0.5 to 30 g/10 min. The modification of the polyolefin results in a lower molecular weight. Therefore when the MI of the starting polyolefin exceeds 40 g/10 min, it becomes difficult to produce a modified polyolefin having an MI of 50 g/10 min or less, and a desirable product cannot be obtained.

The amount of the above compound attached to the polyolefin is $3.0 \times 10^{-5}$ mole/g to $25.5 \times 10^{-5}$ mole/g, preferably $4.0 \times 10^{-5}$ mole/g to $20.0 \times 10^{-5}$ mole/g.

When the amount is less than $3.0 \times 10^{-5}$ mole/g, combining of the modified polyphenylene ether with the modified polyolefin does not proceed sufficiently. When the amount is more than $25.5 \times 10^{-5}$ mole/g, it becomes difficult to obtain a modified polyolefin having an MI of 50 g/10 min or less. Therefore, exfoliation or the formation of a flow mark tends to take place in a molded product.

The binder used in the present invention is a compound used for obtaining a copolymer of the formula (1) by melt-kneading a modified polyphenylene ether obtained, for example, by the above modification method A-1 with a modified polyolefin obtained, for example, by the above modification method B-1. Specific examples of the binder are aliphatic, aromatic and alicyclic diamines such as ethylenediamine, hexamethylenediamine, xylylenediamine, 1,2-cyclohexanediamine, 1,3-cyclohexanediamine, etc.

Although the amount of the binder added is varied depending on the blending ratio between the modified polyphenylene ether obtained by modification method A-1 and the modified polyolefin obtained by modification method B-1, and the content of modifier portions in each of the modified polymers, the amount of the binder is preferably 0.1 to 2.0 moles, more preferably 0.5 to 1.5 moles, per mole of the modifier portions in the blend.

The MI of the copolymer of the modified polyphenylene ether and the modified polyolefin of the present invention is essentially determined by the MI's of the modified polyphenylene ether and the modified polyolefin, and its upper limit is 50 g/10 min.

There are explained below the thermoplastic resin compositions using the copolymer of modified polyphenylene ether and modified polyolefin to which the second and subsequent aspects of the present invention are directed.

The elastomer used in these thermoplastic resin compositions is not critical so long as its Young's modulus is 1,020 kg/cm$^2$ or less.

The elastomer includes, for example, rubber-like polymers such as polybutadienes, styrene-butadiene copolymers, styrene-isoprene copolymers, acrylonitriles-tyrene-butadiene copolymers, ethylene-α-olefin copolymers, ethylene-α-olefin-polyene copolymers, acrylic rubbers, polyisoprenes, and the like, and thermoplastic elastomers such as styrene-butadiene block copolymers, styrene-isoprene block copolymers, hydrogenated styrene-butadiene block copolymers, styrene-grafted ethylene-propylene elastomers, ethylene-based ionomer resins, etc. As the elastomer, there may also be used products obtained by modifying the above polymers with a group such as a carboxyl group, acid anhydride group, epoxy group, hydroxyl group, amino group, or the like, and combinations of two or more of the above polymers.

Preferred examples of the elastomers are the styrene-butadiene copolymers, the ethylene-α-olefin copolymers, the styrene-butadiene block copolymers, the hydrogenated styrene-butadiene block copolymers, and products obtained by modifying these copolymers with a group such as a carboxyl group, acid anhydride group, epoxy group, or the like.

In the thermoplastic resin composition of the present invention, the blending amount of the polyphenylene ether-polyolefin copolymer (A) is 1 to 99 parts by weight, preferably 30 to 99 parts by weight, per 100 parts by weight of the sum of components (A), (B) and (C). The blending amount of the polyphenylene ether or modified polyphenylene ether as component (B) is preferably 95 parts by weight or less. When the amount of component (B) exceeds 95 parts by weight, the solvent resistance is deteriorated. Therefore, such an amount is not preferable for achieving the objects of the present invention. The polyphenylene ether as component (B) can be the same as that described above as a starting material for producing the modified polyphenylene ether described above for preparing component (A), and it is preferably poly(2,6-dimethyl-1,4-phenylene ether). The modified polyphenylene ether as component (B) may be the same as the modified polyphenylene ether described above for preparing component (A). For producing the modified polyphenylene ether useful as component (B), there can be employed the same means for modification as those used for producing the modified polyphenylene ether described above for component (A).

The blending amount of the polyolefin or modified polyolefin as component (C) is preferably 95 parts by weight or less. When the amount of component (C) exceeds 95 parts by weight, the heat resistance of the composition becomes insufficient. Therefore, such an amount is not desirable for achieving the objects of the present invention. As the polyolefin useful as component (C), there can be used the same species of polyolefin as those described above as a starting material for the modified polyolefin described above for preparing component (A). As the modified polyolefin as component (C), there can be used the same modified polyolefin as that described above for component (A). The MI of the modified polyolefin as component (C) is 0.5 to 50, preferably 1.0 to 50.

In the thermoplastic resin compositions of the present invention, the blending amount of the elastomer is 1 to 30 parts by weight, preferably 3 to 15 parts by weight per 100 parts by weight of said thermoplastic composition. When the amount of the elastomer is outside this range, for example, when it is less than 1 part by weight, the impact resistance is low. When the amount is more than 30 parts by weight, the stiffness is deteriorated. Therefore, such amounts are not desirable.

The method for blending the components for producing the composition of the present invention is not critical. It includes, for example, a method comprising blending the components in one lot and melt-kneading the resulting blend; a method comprising melt-kneading the copolymer with the polyolefin, blending therewith the polyphenylene ether and the elastomer, and then melt-kneading the resulting blend; a method comprising melt-kneading the polyphenylene ether with the elastomer, blending therewith a mixture of the copolymer and the polyolefin, and melt-kneading the resulting blend; and a method comprising melt-kneading the copolymer with the polyolefin, blending therewith a mixture of the copolymer, the polyphenylene ether and the elastomer, and melt-kneading the resulting blend. The blending method is not limited to these methods, and other methods can be employed.

The copolymer and compositions of the present invention can, if necessary, be incorporated with plasticizers, antistatic agents, halogen- or phosphorus-containing flame retardants, antioxidants, inorganic fillers (e.g. glass fiber, glass flake, carbon black, silica, clay, mica, talc, kaolin, wollastonite, and calcium carbonate), etc., so long as the objects of the present invention are not defeated.

In a molded product of each of the copolymer and resin compositions of the present invention, a continuous phase can be composed of either the polyphenylene ether and/or modified polyphenylene ether, or the polyolefin and/or modified polyolefin.

In both cases, 70% or more, preferably 80% or more, of a dispersed phase has a particle diameter of 5 $\mu$m or less.

Here, the percentage is $S_1/S_0 \times 100$ (%) wherein $S_0$ is the total area of the dispersed phase, and $S_1$ is the total area of particles having a diameter of 5 $\mu$m or less. The dispersed phase and the particles are observed by observing a section of the molded product by a means such as an electron microscope.

When the percentage of dispersed particles having a diameter of 5 $\mu$m or less is 50% or less as in Comparative Example 1 (see the photomicrograph), the mechanical strength is not sufficient.

EXAMPLES

The present invention is further illustrated by the following examples, which should not be construed as limiting the scope of the invention.

REFERENTIAL EXAMPLE 1

To 100 parts by weight of a poly(2,6-dimethylphenylene-1,4-ether) (hereinafter abbreviated as PPE) having an intrinsic viscosity of 0.55 (at 30° C. in chloroform) and an MI (280° C., 10 kg load) of 2.3 g/10 min was added 1 part of maleic anhydride (hereinafter abbreviated as MAH). The resulting mixture was fed into a twin-screw extruder (AS-30, mfd. by NAKATANI MACHINE CO., LTD.), melt-kneaded at 320° C. and 120 r.p.m., and then pelletized.

In 38 g of toluene was dissolved 2 g of the obtained pellets to prepare a 5 wt % toluene solution, after which 160 g of acetone was added to the solution to precipitate a polymer. The polymer was collected by filtration, washed with acetone, and then dried under reduced pressure at 145° C. for 1 hour. The sample thus obtained was subjected to infrared spectrochemical analysis, and the percentage by weight of MAH attached to the PPE based on the weight of the sample was calculated using a calibration curve previously prepared by the use of the PPE and MAH, and was taken as the amount of MAH attached. The amount of MAH attached was 0.53%.

The MI (230° C., 10 kg load) of the purified polymer was 2.3 g/10 min.

REFERENTIAL EXAMPLE 2

To 100 parts by weight of the modified PPE obtained in Referential Example 1 was added 1 part by weight of hexamethylenediamine (hereinafter abbreviated as HMDA), and the resulting mixture was fed into a twin screw extruder (AS-30, mfd. by NAKATANI MACHINE CO., LTD.), melt-kneaded at 300° C. and 120 r.p.m., and then pelletized.

The resin thus obtained was made into a 5 wt % solution in toluene, after which 300 parts by weight of methanol was added to 100 parts by weight of the solution to precipitate a polymer. The polymer was collected by filtration, washed with methanol, and then dried under reduced pressure at 145° C. for 1 hour.

The MI (280° C., 10 kg load) of the purified polymer was 1.8 g/10 min.

When the sample before purification was subjected to infrared spectrochemical analysis, no absorption due to MAH was observed. The sample after purification was subjected to infrared spectrochemical analysis, and there was measured a difference spectrum by subtracting an infrared absorption spectrum of the purified sample obtained in Referential Example 1 from that of the sample after purification obtained in Referential Example 2. Consequently, an absorption due to an imide was observed, indicating that the diamine was attached to the PPE through an imide group.

In addition, the sample after purification was analyzed for nitrogen by a reduced-pressure chemiluminescence method, whereby the amount of nitrogen added was measured to find that the amount (the number of moles) of nitrogen added was 1.8 times as much as the amount (the number of moles) of maleic anhydride added in the sample of Referential Example 1.

The intrinsic viscosity (at 30° C. in chloroform) of the sample after purification of Referential Example 2 was 0.58, namely, substantially no coupling of molecules of the polymer of Referential Example 1 had occurred.

The above facts indicate that the polymer of Referential Example 2 is a modified PPE having amino groups as functional groups which has a structure wherein an alkylamino group is linked to PPE through an imide linkage.

REFERENTIAL EXAMPLE 3

To 100 parts by weight of a polypropylene (MI=0.5 g/10 min) were added 3.0 parts of MAH and 0.05 part of (2,5-dimethyl-2,5-)di(t-butylperoxy)hexane, and the resulting mixture was melt-kneaded at a temperature of 190° C. with a twin-screw extruder and pelletized. The pellets obtained were dissolved in hot xylene, reprecipitated with acetone, and then collected by filtration, after which the polymer thus obtained was dried, whereby the unreacted MAH was removed. The percentage by weight of MAH attached to the polypropylene based on the weight of the purified polymer was calculated using a calibration curve previously prepared by the use of the polypropylene and MAH, and was taken as the amount of MAH attached. The amount of MAH attached was 0.62%.

The MI (230° C., 2.16 kg load) of the purified polymer was 3.0 g/10 min.

REFERENTIAL EXAMPLE 4

To 100 parts by weight of a polypropylene (MI=0.5 g/10 min) were added 3.0 parts of MAH and 0.15 part of (2,5-dimethyl-2,5-)di(t-butylperoxy)hexane, and the resulting mixture was melt-kneaded at a temperature of 190° C. with a twin-screw extruder and pelletized. The pellets obtained were dissolved in hot xylene, reprecipitated with acetone, and then collected by filtration, after which the polymer thus obtained was dried, whereby the unreacted MAH was removed. The percentage by weight of MAH attached to the polypropylene based on the weight of the purified polymer was calculated using a calibration curve previously prepared by the use of the polypropylene and MAH, and was taken as the amount of MAH attached. The amount of MAH attached was 1.38%.

The MI (230° C., 2.16 kg load) of the purified polymer was 21.0 g/10 min.

EXAMPLE 1

In a roll mill was placed 40 g of the amine-modified PPE synthesized in Referential Example 2 and 40 g of the MAH-modified polypropylene synthesized in Referential Example 3. The mixture was melt-kneaded at 250° C. and 100 r.p.m. for 5 minutes.

The sample thus obtained was subjected to infrared spectrochemical analysis, and there was measured a difference spectrum by subtracting infrared absorption spectra of the amine-modified PPE synthesized in Referential Example 2 and the MAH-modified polypropylene synthesized in Referential Example 3, respectively, from an infrared absorption spectrum of the sample obtained. Consequently, the acid anhydride of the MAH-modified polypropylene was found to disappear, and there was observed a strong absorption due to an imide which indicated that an imide linkage had been newly formed.

EXAMPLE 2

In a roll mill were placed 40 g of the amine-modified PPE synthesized in Referential Example 2 and 40 g of the MAH-modified polypropylene synthesized in Referential Example 4. The mixture was melt-kneaded at 250° C. and 100 r.p.m. for 5 minutes.

COMPARATIVE EXAMPLE 1

In a roll mill were placed 40 g of the amine-modified PPE synthesized in Referential Example 2 and 40 g of an MAH-modified polypropylene (KZ-810, mfd. by Arakawa Chemical Co., Ltd.) having an MI (230° C., 2.16 kg load) of 60.0 g/10 min and an amount of MAH attached of 1.5%. The mixture was and melt-kneaded at 250° C. and 100 r.p.m. for 5 minutes.

EXAMPLES 3 AND 4

The process of Referential Example 2 was repeated except for using 1,12-diaminododecane in place of hexamethylenediamine, whereby an amine-modified PPE was obtained. In a roll mill were placed 40 g of this modified PPE and 40 g of the MAH-modified polypropylene obtained in Referential Example 3 or 4, and melt-kneaded at 250° C. and 100 r.p.m. for 5 minutes. The experiments using the MAH-modified polypropylene obtained in Referential Example 3 and the experiment using the MAH-modified polypropylene obtained in Referential Example 4 were used as Example 3 and Example 4, respectively.

COMPARATIVE EXAMPLE 2

In a roll mill were placed 40 g of the same amine-modified PPE as used in Example 3 and 40 g of an MAH-modified polypropylene (KZ-810, mfd. by Arakawa Chemical Co., Ltd.) having an MI (230° C., 2.16 kg load) of 60.0 g/10 min and an amount of MAH attached of 1.5%. The mixture was melt-kneaded at 250° C. and 100 r.p.m. for 5 minutes.

EXAMPLES 5 AND 6

The process of Referential Example 1 was repeated except for using glycidyl methacrylate (hereinafter abbreviated as GMA) in place of MAH, and further adding 0.3 part by weight of dicumyl peroxide to the PPE. However, a calibration curve used in infrared spectrochemical analysis was prepared by the use of the PPE and GMA. The amount of GMA attached was 0.45% by weight.

In addition, the process of Referential Example 2 was repeated, except that the modified PPE obtained in the manner described above was used in place of the modified PPE used in Referential Example 2. Thus, an amine-modified PPE was obtained. The process of each of Example 1 and Example 2 was repeated except for using this amine-modified PPE in place of the amine-modified PPE used in Example 1 and Example 2. The case of repeating the process of Example 1 and the case of repeating the process of Example 2 were used as Example 5 and Example 6, respectively.

COMPARATIVE EXAMPLE 3

In a roll mill were placed 40 g of the same amine-modified PPE as used in Example 5 and 40 g of an MAH-modified polypropylene (KZ-810, mfd. by Arakawa Chemical Co., Ltd.) having an MI (230° C., 2.16 kg load) of 60.0 g/10 min and an amount of MAH attached of 1.5%. The mixture was melt-kneaded at 250° C. and 100 r.p.m. for 5 minutes.

EXAMPLES 7 AND 8

The process of Referential Example 1 was repeated except for using a triisocyanate compound having a structure of the formula (12):

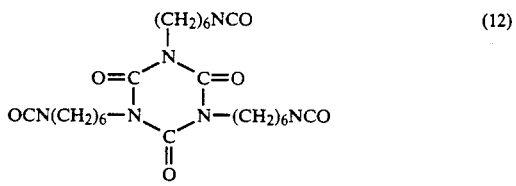

in place of MAH. To 100 parts by weight of the modified PPE thus obtained was added 1.5 parts by weight of HMDA, and the resulting mixture was fed into a twin-screw extruder (As-30, mfd. by NAKATANI MACHINE CO., LTD.) and melt-kneaded at 300° C. and 120 r.p.m. and pelletized, whereby an amine-modified PPE was obtained. The process of each of Example 1 and Example 2 was repeated except for using this amine-modified PPE in place of the amine-modified PPE used in Example 1 and Example 2. The case of repeating the process of Example 1 and the case of repeating the process of Example 2 were used as Example 7 and Example 8, respectively.

COMPARATIVE EXAMPLE 4

In a roll mill were placed 40 g of the same amine-modified PPE as used in Example 7 and 40 g of an MAH-modified polypropylene (KZ-810, mfd. by Arakawa Chemical Co., Ltd.) having an MI (230° C., 2.16 kg load) of 60.0 g/10 min and an amount of MAH attached of 1.5%. The mixture was melt-kneaded at 250° C. and 100 r.p.m. for 5 minutes.

Each of the samples obtained in Examples 1 to 8 and Comparative Examples 1 to 4 was made into dumbbell specimens of 1.0 mm in thickness and strips of ⅛ inch in thickness at 270° C. and 180 kg/cm², and their tensile strength, elongation and Izod impact strength were measured.

The results obtained are shown in Table 1.

TABLE 1

|  | Tensile strength (kg/cm²) | Elongation (%) | Izod impact strength (kg · cm/cm) |
|---|---|---|---|
| Example 1 | 490 | 58.5 | 7.9 |
| Example 2 | 430 | 49.4 | 2.9 |
| Comparative Example 1 | 200 | 13.0 | 1.6 |
| Example 3 | 490 | 58.3 | 7.8 |
| Example 4 | 420 | 49.1 | 2.8 |
| Comparative Example 2 | 190 | 9.6 | 1.5 |
| Example 5 | 480 | 53.5 | 7.2 |
| Example 6 | 400 | 45.0 | 3.2 |
| Comparative Example 3 | 170 | 7.7 | 1.5 |
| Example 7 | 340 | 48.5 | 6.0 |
| Example 8 | 280 | 39.9 | 2.6 |
| Comparative Example 4 | 150 | 7.7 | 1.5 |

For Examples 1 and 2 and Comparative Example 1, morphology was observed by a transmission electron microscope. Consequently, it was confirmed that in the case of Examples 1 and 2, the diameter of dispersed particles was much smaller than in the case of Comparative Example 1.

The diameter of a circle having an area equivalent to that of a dispersed particle observed by the transmission electron microscope was calculated using an apparatus for analysis and processing of computer images (IP-1000, mfd. by Asahi Chemical Industry Co.), and taken as the diameter of the dispersed particles. As a result of calculation of the particle diameter distribution, it was found that the percentage of the area of particles with a diameter of 5 μm or less based on the total area of the dispersed phase was 100% and 75% for Examples 1 and 2, respectively, but was only 34% for Comparative Example 1.

Thus, it was confirmed that a satisfactory morphology can be obtained by specifying the MI of modified polypropylene.

The conditions of observation by the transmission electron microscope were as follows.

A small piece was cut out of each of the polymers obtained in Examples 1 and 2 and Comparative Example 1 and trimmed with a glass knife by using an ultramicrotome. This sample was immersed in a 2% aqueous osmic acid solution, allowed to stand at 80° C. for 40 minutes, thereafter set in the ultramicrotome again, and then made into an ultrathin slice of about 1,500 to 2,000 angstrom in thickness with a diamond knife. The ultrathin slice was set in the specimen chamber of a transmission electron microscope (Model JEM-100SXT, mfd. by JEOL LIMITED), subjected to electron staining, observed, and photographed. The photographing was conducted at a magnification of 2,000 for Examples 1 and 2, and 500 for Comparative Example 1.

As is clear from Table 1, the bonding between a modified PPE and a modified PP which had a melt viscosity in the specified range greatly improved the mechanical strength.

REFERENTIAL EXAMPLE 5

The MAH-modified PP obtained in Referential Example 4 was dissolved in hot xylene to obtain a 10% xylene solution. To this solution was added 100 parts by weight of a 15 wt % solution of HMDA in hot xylene, and reaction was carried out for 1 hour. After completion of the reaction, the reaction solution was cooled to room temperature, and a large amount of acetone was added. The precipitate thus formed was collected by filtration, washed with acetone, and then vacuum-dried.

As a result of infrared spectrochemical analysis of the purified sample thus obtained, an absorption due to an imide group was observed. The amount of nitrogen added was measured by analyzing the sample for nitrogen by a reduced-pressure chemiluminescence method, to find that the amount (the number of moles) of nitrogen added was 2.0 times as much as the amount (the number of moles) of maleic anhydride added in the sample of Referential Example 4. In addition, the MI (230° C., 2.16 kg load) of the polymer obtained in Referential Example 5 was 21.0 g/10 min which was the same as that of the MAH-modified PP of Referential Example 4.

REFERENTIAL EXAMPLE 6

To 100 parts by weight of a PPE having an intrinsic viscosity of 0.90 (at 30° C. in chloroform) was added 1 part of MAH, and the resulting mixture was fed into a twin-screw extruder (AS-30, mfd. by NAKATANI MACHINE CO., LTD.) and melt-kneaded at 320° C. and 120 r.p.m. and pelletized.

In 38 g of toluene was dissolved 2 g of the obtained pellets to prepare a 5 wt % toluene solution, after which 160 g of acetone was added to this solution to precipitate a polymer. The polymer was collected by filtration, washed with acetone, and then dried under reduced pressure at 145° C. for 1 hour. The sample thus obtained was subjected to infrared spectrochemical analysis, and the percentage by weight of MAH attached to the PPE based on the weight of the sample was calculated using a calibration curve previously prepared by the use of the PPE and MAH, and was taken as the amount of MAH attached. The amount of MAH attached was 0.40%.

The MI (280° C., 10 kg load) of the purified polymer was less than 0.01 g/10 min.

To 100 parts by weight of the modified PPE obtained was added 1 part by weight of HMDA, and the resulting mixture was fed into a twin-screw extruder (AS-30, mfd. by NAKATANI MACHINE CO., LTD.), and melt-kneaded at 300° C. and 120 r.p.m. and pelletized.

The resin thus obtained was made into a 5 wt % solution in toluene, after which 300 parts by weight of methanol was added to 100 parts by weight of the solution to precipitate a polymer. This polymer was collected by filtration, washed with methanol, and then dried under reduced pressure at 145° C. for 1 hour.

The MI (280° C., 10 kg load) of the polymer thus purified was less than 0.01 g/10 min.

REFERENTIAL EXAMPLE 7

To 100 parts by weight of a PP (Acepolypro E1100, mfd. by Asahi Chemical Industry Co.) having an MI (230° C., 2.16 kg load) of 0.5 g/10 min were added 3.5 parts by weight of MAH and 1.0 part by weight of (2,5-dimethyl-2,5-)di(t-butylperoxy)hexane. The resulting mixture was melt-kneaded at 190° C. and 200 r.p.m. and pelletized, whereby a MAH-modified PP having an MAH content of 2.3 wt % was obtained. The MI (230° C., 2.16 kg load) of the polymer obtained was 200 g/10 min.

REFERENTIAL EXAMPLE 8

To 100 parts by weight of a PPE having an intrinsic viscosity of 0.90 (at 30° C. in chloroform) were added 2 parts by weight of MAH and 1.0 part by weight of (2,5-dimethyl-2,5-)di(t-butylperoxy)hexane. The resulting mixture was fed into a twin-screw extruder and melt-kneaded at 300° C. and 150 r.p.m. for a residence time of 53 seconds, and pelletized.

The MI (280° C., 10 kg load) of the polymer thus obtained was 0.4 g/10 min.

EXAMPLE 9

A PPE having an intrinsic viscosity of 0.55 (at 30° C. in chloroform), the amine-modified PPE of Referential Example 2, an unmodified PP (Acepolypro E1100, mfd. by Asahi Chemical Industry Co.) and the MAH-modified PP of Referential Example 3 were blended according to the recipe shown in Tables 2-3. The resulting blend was melt-kneaded with a twin-screw extruder (30 mmφ) and pelletized.

EXAMPLE 10

The process of Example 9 was repeated except for using the MAH-modified PP of Referential Example 4 in place of the MAH-modified PP of Referential Example 3. This experiment was used as Example 10.

COMPARATIVE EXAMPLE 5

The process of Example 9 was repeated, except that the same MAH-modified PP as used in Referential Example 1 was used in place of the MAH-modified PP of Referential Example 3. This experiment was used as Comparative Example 5.

COMPARATIVE EXAMPLE 6

The process of Example 9 was repeated, except that the same amine-modified PPE as used in Referential Example 6 was used in place of the amine-modified PPE of Referential Example 2. This experiment was used as Comparative Example 6.

EXAMPLE 11

A PPE having an intrinsic viscosity of 0.55 (at 30° C. in chloroform), the MAH-modified PPE of Referential Example 1, an unmodified PP (Acepolypro E1200, mfd. by Asahi Chemical Industry Co.) having an MI (230° C., 2.16 kg load) of 1.5 g/10 min and the amine-modified PP of Referential Example 7 were blended according to the recipe shown in Tables 2-3. The resulting blend was melt-kneaded with a twin-screw extruder (30 mmφ) and pelletized.

COMPARATIVE EXAMPLE 7

The process of Referential Example 11 was repeated except for using the MAH-modified PPE of Referential Example 8 and the amine-modified PP of Referential Example 7 in place of the MAH-modified PPE of Referential Example 1 and the amine-modified PP of Referential Example 5, respectively. This experiment was used as Comparative Example 7.

COMPARATIVE EXAMPLE 8

71.5 Parts of a PPE having an intrinsic viscosity of 0.55 (at 30° C. in chloroform), 28.5 parts of an unmodified PP (Acepolypro E1200, mfd. by Asahi Chemical Industry Co.), and 7.5 parts of a styrene-butadiene copolymer (Asaflex 810, mfd. by Asahi Chemical Industry Co.) were blended. The resulting blend was melt-kneaded with a twin-screw extruder (30 mm$\phi$) and pelletized.

COMPARATIVE EXAMPLE 9

71.5 Parts of a PPE having an intrinsic viscosity of 0.55 (at 30° C. in chloroform), 28.5 parts of an unmodified PP (Acepolypro E1200, mfd. by Asahi Chemical Industry Co.), and 20 parts of a styrene-butadiene copolymer (Asaflex 810, mfd. by Asahi Chemical Industry Co.) were blended. The resulting blend was melt-kneaded with a twin-screw extruder (30 mm$\phi$) and pelletized.

The pellets obtained in each of Examples 9 to 11 and Comparative Examples 5 to 9 were injection-molded at a cylinder temperature of 290° C. and a mold temperature of 80° C. Physical properties of the molded products thus obtained were measured. Tables 2 to 3 show the MI of each starting material and the results of measurements of the physical properties.

EXAMPLES 12 TO 14

With 100 parts of each of the compositions consisting of starting materials which had been prepared in Examples 9 to 11 was blended 12 parts by weight of a styrene-butadiene copolymer (Tufprene 200, mfd. by Asahi Chemical Industry Co.) as an elastomer. The resulting blend was melt-kneaded with a twin-screw extruder (30 mm$\phi$) and pelletized.

COMPARATIVE EXAMPLES 10 TO 12

With 100 parts of each of the compositions consisting of starting materials which had been prepared in Comparative Examples 5 to 7 was blended 12 parts by weight of a hydrogenated styrene-butadiene block copolymer (Tuftec H1271, mfd. by Asahi Chemical Industry Co.) as an elastomer. The resulting blend was melt-kneaded with a twin-screw extruder (30 mm$\phi$) and pelletized.

The pellets obtained in each of Examples 12 to 14 and Comparative Examples 10 to 12 were injection-molded at a cylinder temperature of 290° C. and a mold temperature of 80° C. Physical properties of the molded products thus obtained were measured. Table 4 shows the MI of each starting material and the results of measurements of the physical properties.

TABLE 2

|  | Example 9 | Example 10 | Comparative Example 5 | Comparative Example 6 |
|---|---|---|---|---|
| PPE (MI) g/10 min | 2.3 | 2.3 | 2.3 | 2.3 |
| MAH-modified PPE (MI) g/10 min | — | — | — | — |
| Amine-modified PPE (MI) g/10 min | 1.8 | 1.8 | 1.8 | 0.01> |
| PP (MI) g/10 min | 0.5 | 0.5 | 0.5 | 0.5 |
| MAH-modified PPE (MI) g/10 min | 3.0 | 21.0 | 60.0 | 21.0 |
| Amine-modified PPE (MI) g/10 min | — | — | — | — |
| Izod impact strength (kg · cm/cm) | 15.8 | 13.5 | 4.2 | 6.0 |
| HDT (°C.) |  |  |  |  |
| High load | 166 | 166 | 158 | 162 |
| Low load | 187 | 187 | 187 | 187 |
| Flexural modulus (kg/cm$^2$) (abbrev. FM) | 23700 | 23500 | 21300 | 22300 |
| Appearance of molded product | Good | Good | Peeling | Peeling |

TABLE 3

|  | Example 11 | Comparative Example 7 | Comparative Example 8 | Comparative Example 9 |
|---|---|---|---|---|
| PPE (MI) g/10 min | 2.3 | 2.3 | 2.3 | 2.3 |
| MAH-modified PPE (MI) g/10 min | 2.3 | 0.4 | — | — |
| Amine-modified PPE (MI) g/10 min | — | — | — | — |
| PP (MI) g/10 min | 1.5 | 1.5 | 0.5 | 0.5 |
| MAH-modified PPE (MI) g/10 min | — | — | — | — |
| Amine-modified PPE (MI) g/10 min | 21.0 | 200 | — | — |
| Izod impact strength (kg · cm/cm) | 12.1 | 3.6 | 7.5 | 18.8 |
| HDT (°C.) |  |  |  |  |
| High load | 166 | 158 | 150 | 123 |
| Low load | 187 | 187 | 180 | 155 |
| FM (kg/cm$^2$) | 23000 | 21000 | 19500 | 19000 |
| Appearance of molded product | Good | Good | Peeling | Flow mark |

Note:
PPE/modified PPE/PP/modified PP = 66.2/5.3/23.2/5.3 (parts by weight)
Comparative Example 8: PPE/PP/styrene-butadiene copolymer = 71.5/28.5/7.5
Comparative Example 9: PPE/PP/styrene-butadiene copolymer = 71.5/28.5/20.0

TABLE 4

|  | Example 12 | Example 13 | Comparative Example 10 | Comparative Example 11 | Example 14 | Comparative Example 12 |
|---|---|---|---|---|---|---|
| PPE (MI) g/10 min | 2.3 | 2.3 | 2.3 | 2.3 | 2.3 | 2.3 |
| MAH-modified PPE (MI) g/10 min | — | — | — | — | 2.3 | 0.4 |
| Amine-modified PPE | 1.8 | 1.8 | 1.8 | 0.01> | — | — |

TABLE 4-continued

| (MI) g/10 min | | | | | | |
|---|---|---|---|---|---|---|
| PP (MI) g/10 min | 0.5 | 0.5 | 0.5 | 0.5 | 1.5 | 1.5 |
| MAH-modified PPE (MI) g/10 min | 3.0 | 21.0 | 60.0 | 21.0 | — | — |
| Amine-modified PPE (MI) g/10 min | — | — | — | — | 21.0 | 200 |
| Izod impact strength (kg · cm/cm) | 30.2 | 29.5 | 8.2 | 10.0 | 28.5 | 6.8 |
| HDT (°C.) | | | | | | |
| High load | 161 | 161 | 153 | 155 | 160 | 151 |
| Low load | 184 | 184 | 182 | 180 | 183 | 178 |
| FM (kg/cm$^2$) | 23000 | 22900 | 20200 | 20400 | 22900 | 20000 |

Note:
(PPE/modified PPE/PP/modified PP)/elastomer = (66.2/53/23.2/5.3)/12.0 (parts by weight)

EXAMPLE 15

50 Parts by weight each of the same amine-modified PPE and MAH-modified polypropylene as used in Example 1 were blended with 12 parts by weight of a hydrogenated styrene-butadiene block copolymer (Tuftec H1271, mfd. by Asahi Chemical Industry Co.) as elastomer. The resulting blend was melt-kneaded with a twin-screw extruder (30 mmφ) and pelletized.

Similarly, 50 parts by weight each of a modified PPE and a modified polypropylene in the same combination as in each of Examples 2 to 8 were blended with 12 parts by weight of a hydrogenated styrene-butadiene block copolymer (Tuftec H1271, mfd. by Asahi Chemical Industry Co.) as elastomer. The resulting blend was melt-kneaded with a twin-screw extruder (30 mmφ) and pelletized. These experiments using the same combination as in each of Examples 2 to 8 were used as Examples 16 to 22, respectively.

COMPARATIVE EXAMPLES 13 TO 16

50 Parts by weight each of a modified PPE and a modified polypropylene in the same combination as each of Comparative Examples 1 to 4 were blended with 12 parts by weight of a hydrogenated styrene-butadiene block copolymer (Tuftec H1271, mfd. by Asahi Chemical Industry Co.). The resulting blend was melt-kneaded with a twin-screw extruder (30 mmφ) and pelletized. These experiments using the same combination as in Comparative Examples 1 to 4 were used as Comparative Examples 13 to 16, respectively.

The pellets obtained in each of Examples 15 to 22 and Comparative Examples 13 to 16 were injection-molded at a cylinder temperature of 290° C. and a mold temperature of 80° C. Physical properties of the molded products thus obtained were measured. Table 5 shows the MI of each starting material and the results of measurements of the physical properties.

TABLE 5

| | FM (kg/cm$^2$) | Izod impact strength (kg · cm/cm) | Heat distortion temperature (°C.) | |
|---|---|---|---|---|
| | | | 4.6 kg/cm$^2$ | 18.6 kg/cm$^2$ |
| Example 15 | 17,300 | 37.0 | 155 | 118 |
| Example 16 | 17,100 | 34.0 | 153 | 120 |
| Comparative Example 13 | 16,100 | 10.5 | 147 | 117 |
| Example 17 | 17,200 | 36.3 | 157 | 117 |
| Example 18 | 16,900 | 31.4 | 152 | 115 |
| Comparative Example 14 | 15,800 | 9.6 | 144 | 115 |
| Example 19 | 16,800 | 34.1 | 151 | 117 |
| Example 20 | 16,700 | 30.0 | 150 | 117 |
| Comparative Example 15 | 15,600 | 8.2 | 141 | 116 |
| Example 21 | 16,700 | 35.2 | 152 | 118 |
| Example 22 | 16,500 | 26.5 | 152 | 116 |
| Comparative Example 16 | 15,600 | 8.5 | 143 | 117 |

As can be seen from the above examples, when a modified PPE and a modified PP each of which had a melt viscosity in a specified range were covalently bound to each other in a specified manner, peeling in a molded product could be prevented and a high mechanical strength could be exhibited.

The polyphenylene ether-polyolefin copolymer and the resin compositions containing the same of the present invention are excellent in heat resistance, thermal stability, mechanical strength and solvent resistance, and hence are useful for the production of outside plates and external trims of automobiles, electrical and electronic machinery and apparatus, etc.

What is claimed is:

1. A polyphenylene ether-polyolefin copolymer obtained by reacting a modified polyphenylene ether having an MI (280° C., 10 kg load) of 0.01 to 10 g/10 min with a modified polyolefin having an MI (230° C., 2.16 kg load) of 1.0 to 50 g/10 min in the presence or absence of a binder, and comprising a polyphenylene ether block and a polyolefin block which are covalently bound to each other in a manner represented by the formula (1):

$$P-Z_1-R_1-Z_2-Q \qquad (1)$$

wherein P is a polyphenylene ether component; Q is a polyolefin component; $Z_1$ is an imide group, an amide group, or a connecting group represented by the formula (2):

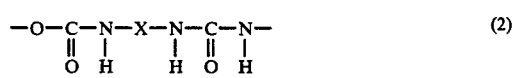 (2)

or the formula (3):

 (3)

wherein X is an alkylene group, an arylene group, a cycloalkylene group, or a cyclized product of a dimer or trimer of an isocyanate; $Z_2$ is an imide group, an amide group, or a connecting group represented by the formula (4):

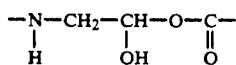 (4)

and $R_1$ is an alkylene group, an arylene group or a cycloalkylene group.

2. A thermoplastic composition comprising
(A) a polyphenylene ether-polyolefin copolymer obtained by reacting a modified polyolefin ether having an MI (280° C., 10 kg load) of 0.01 to 10 g/10 min with a modified polyolefin having an MI (230° C., 2.16 kg load) of 1.0 to 50 g/10 min in the presence or absence of a binder, and comprising a polyphenylene ether block and a polyolefin block which are covalently bound to each other in a manner represented by the formula (1):

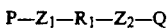 (1)

wherein P is a polyphenylene ether component; Q is a polyolefin component; $Z_1$ is an imide group, an amide group, or a connecting group represented by the formula (2):

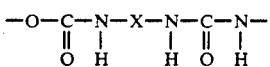 (2)

or the formula (3):

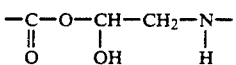 (3)

wherein X is an alkylene group, an arylene group, a cycloalkylene group, or a cyclized product of a dimer or trimer of an isocyanate; $Z_2$ is an imide group, an amide group, or a connecting group represented by the formula (4):

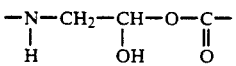 (4)

and $R_1$ is an alkylene group, an arylene group or a cycloalkylene group;
(B) a polyphenylene ether and/or a modified polyphenylene ether, the modified polyether having a functional group selected from the group consisting of carboxylic acid groups, ester derivative groups thereof, acid anhydride groups, epoxy groups, amino groups, and isocyanate groups;
(C) a polyolefin and/or a modified polyolefin, the modified polyolefin having a functional group selected from the group consisting of carboxylic acid groups, ester derivative groups thereof, acid anhydride groups, epoxy groups, and amino groups, and
(D) at least one elastomer, the amounts of components (A), (B) and (C) per 100 parts by weight of the sum of these three components being in the following ranges:
(A): 1 to 99 parts by weight,
(B): 0 to 95 parts by weight, and
(C): 0 to 95 parts by weight, and the amount of component (D) being 0 to 30 parts by weight per 100 parts by weight of the sum of components (A), (B) and (C).

3. A thermoplastic resin composition according to claim 2, wherein the amount of elastomer (D) is 0 part by weight.

4. A thermoplastic resin composition according to claim 2, wherein the amount of elastomer (D) is 1 to 30 parts by weight.

5. A thermoplastic resin composition according to claim 2, wherein the amount of each of components (B) and (C) is 0 part by weight, and the component (D) is contained in the amount of 1 to 30 parts by weight per 100 parts by weight of the component (A).

6. A copolymer according to claim 1, wherein the modified polyphenylene ether is that obtained by modifying a poly(2,6-dimethyl-1,4-phenylene) ether.

7. A thermoplastic resin composition according to claim 2, wherein the polyphenylene ether is a poly(2,6-dimethyl-1,4-phenylene) ether.

8. A copolymer according to claim 1, wherein the modified polyphenylene ether is a polyphenylene ether modified with maleic anhydride.

9. A copolymer according to claim 1, wherein the binder is hexamethylenediamine.

10. A copolymer according to claim 1, wherein the modified polyphenylene ether is that obtained by modifying a maleic-anhydride-modified polyphenylene ether with hexamethylenediamine.

11. A copolymer according to claim 1, wherein the polyolefin is a polypropylene or a polyethylene.

12. A copolymer according to claim 1, wherein the modified polyolefin is a polyolefin modified with maleic anhydride.

13. A thermoplastic resin composition according to claim 2, wherein the MI (230° C., 2.16 kg load) of each of the polyolefin and the modified polyolefin as component (C) is 0.5 to 50 g/10 min.

14. A thermoplastic resin composition according to claim 2, wherein the elastomer is selected from a styrene-butadiene block copolymer and a hydrogenated styrene-butadiene block copolymer.

15. A thermoplastic resin composition comprising a copolymer claimed in claim 1, which has an MI (230° C., 2.16 kg load) of 50 g/10 min or less.

16. A molded product obtained from a thermoplastic resin composition claimed in claim 2, in which 70% or more of a dispersed phase comprises particles having a diameter of 5 μm or less.

* * * * *